Figure 1:
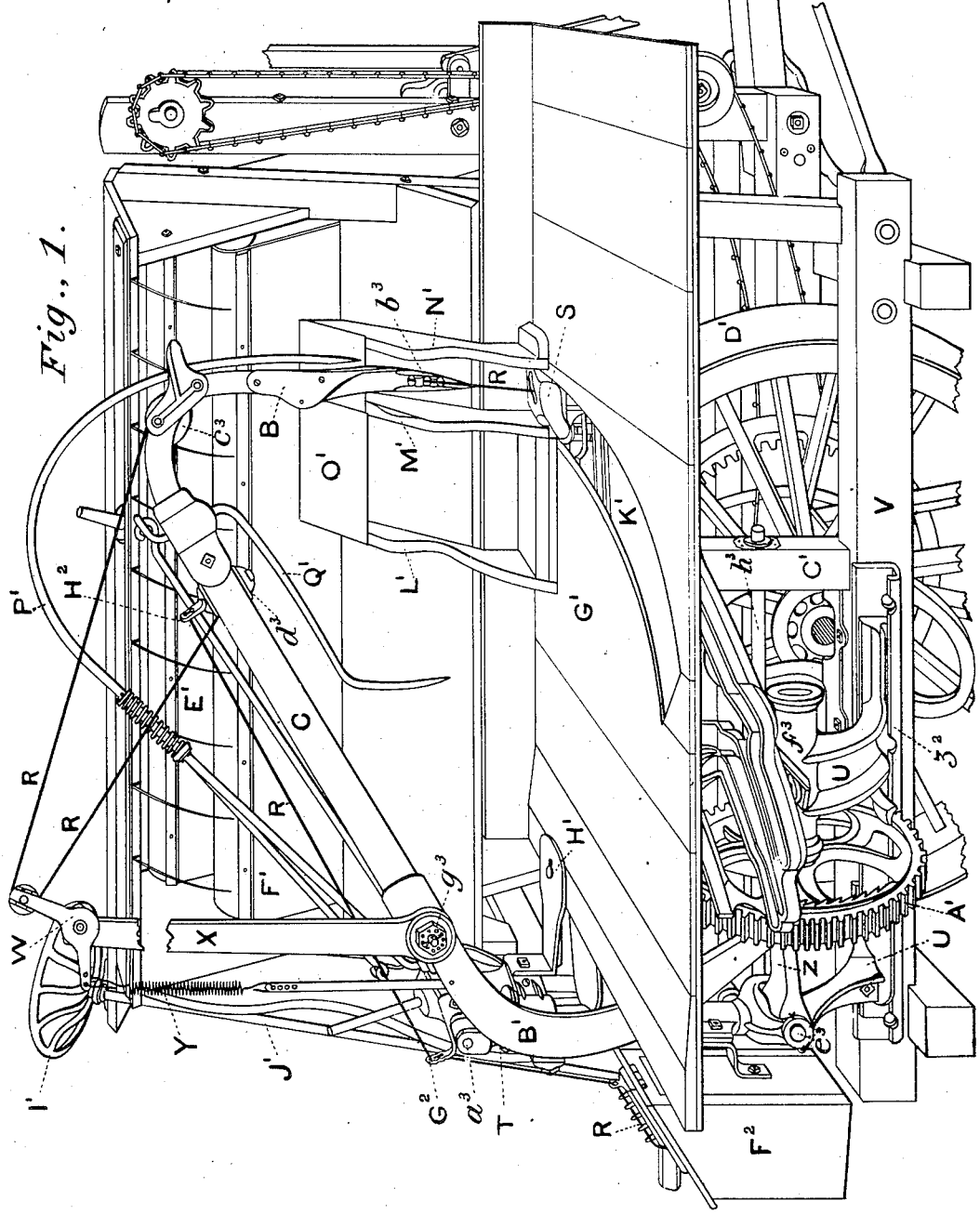

(Model.)

14 Sheets—Sheet 1.

C. WHEELER, Jr.
GRAIN BINDER.

No. 266,001.

Patented Oct. 17, 1882.

Witnesses
John G. Center
Alex Mahon

Inventor:
C. Wheeler Jr.
by A. M. Smith
attorney

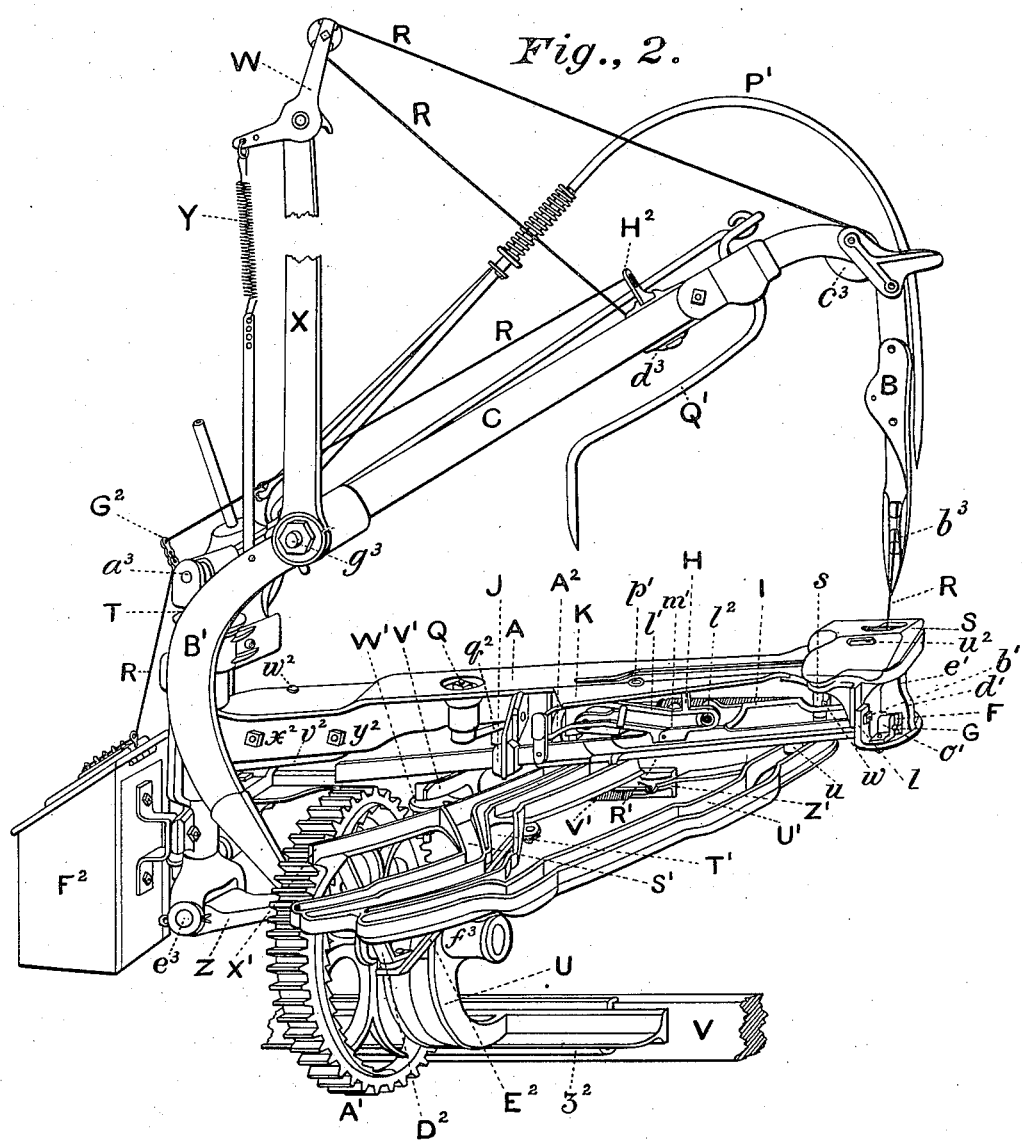

(Model.)
14 Sheets—Sheet 3.
C. WHEELER, Jr.
GRAIN BINDER.
No. 266,001. Patented Oct. 17, 1882.
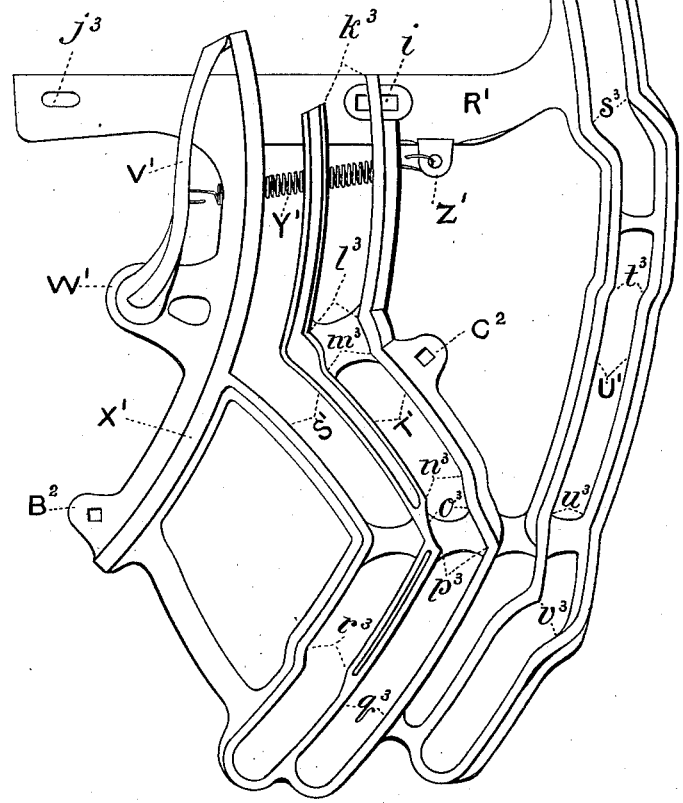
Fig., 3.
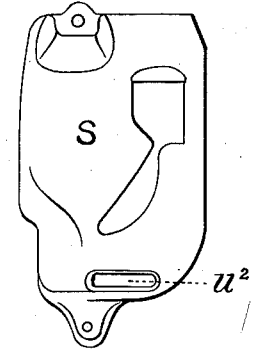
Fig., 5
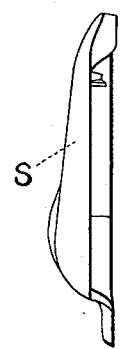
Fig., 6.
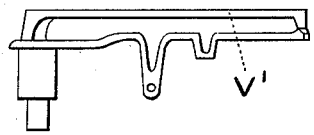
Fig., 4.
Witnesses:
John C. Center
Alex Mahon
Inventor:
C. Wheeler Jr,
by A. M. Smith
Attorney, (Model.)
C. WHEELER, Jr.
GRAIN BINDER.
No. 266,001.
14 Sheets—Sheet 4.
Patented Oct. 17, 1882.
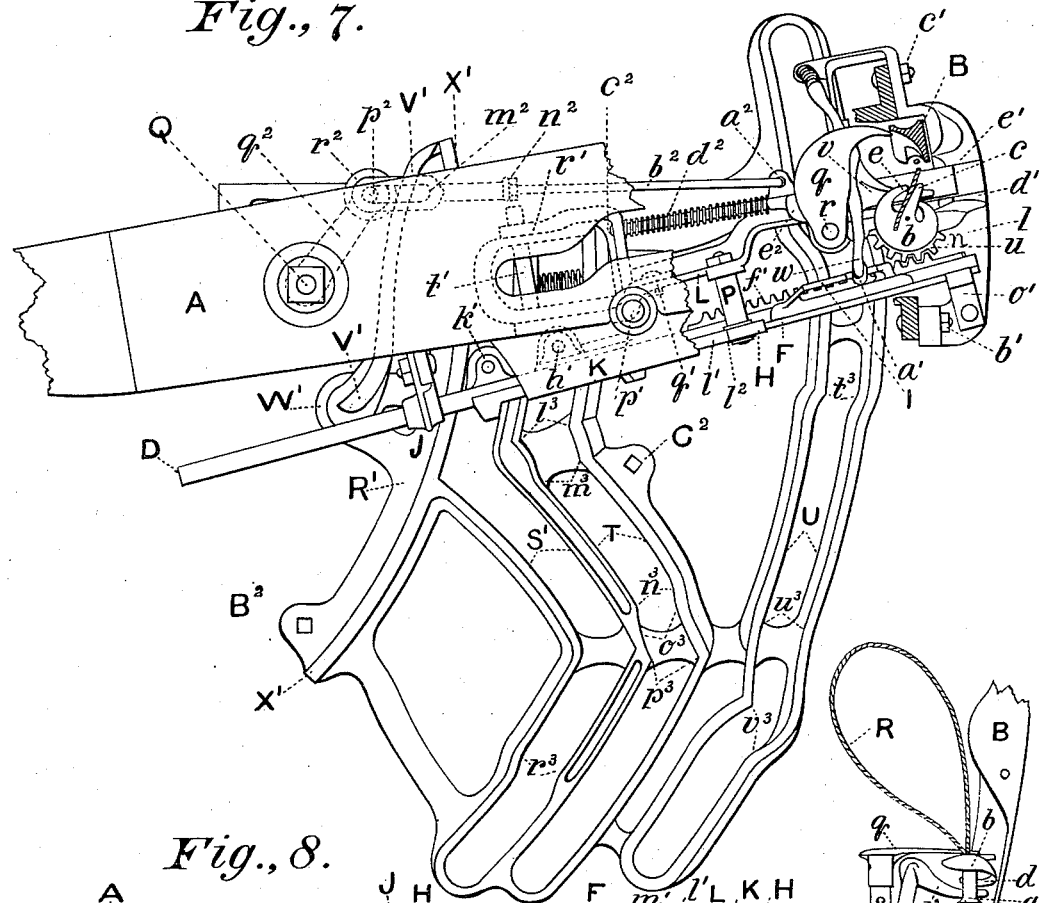
Fig., 7.
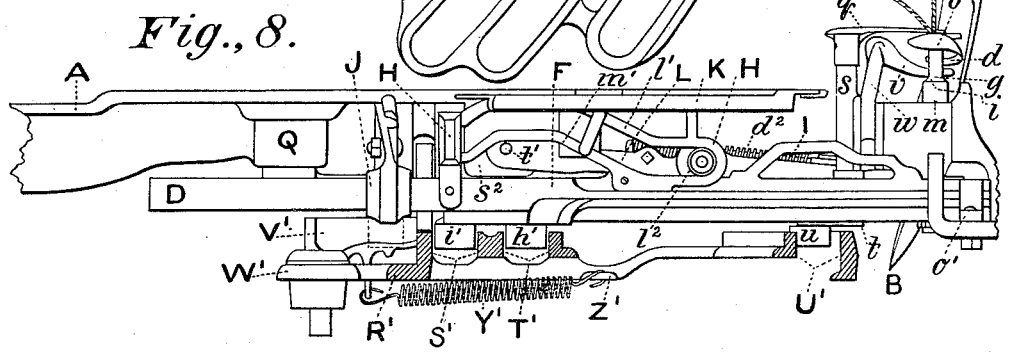
Fig., 8.
Witnesses:
John G. Center
Alex Mahon
Inventor:
C. Wheeler Jr.
by S. M. Smith
Attorney.

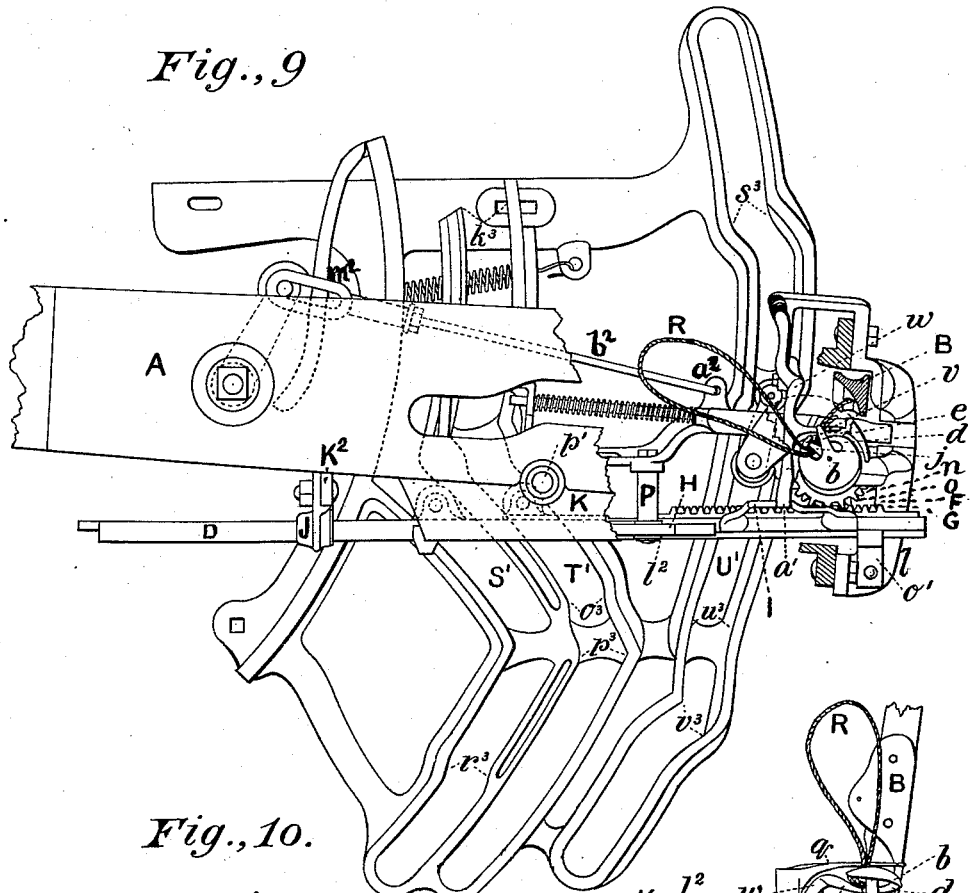
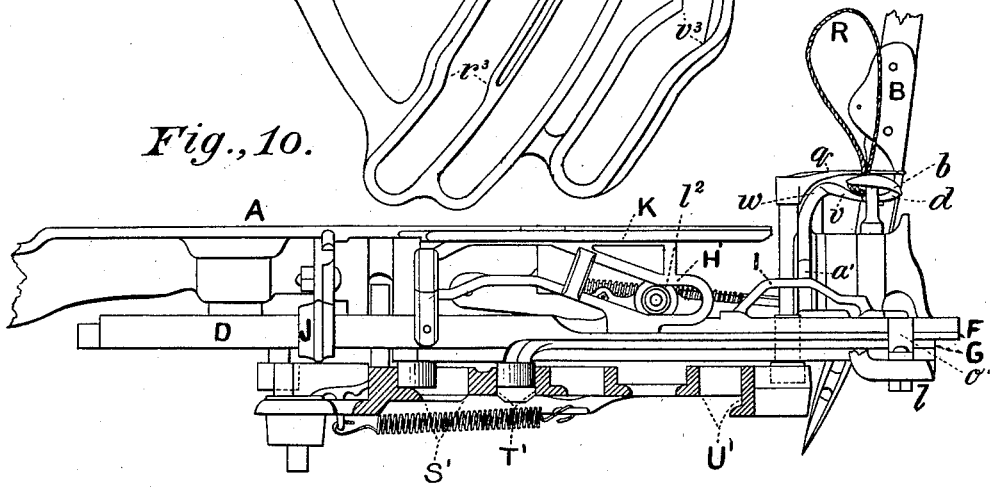

(Model.)
C. WHEELER, Jr.
GRAIN BINDER.
No. 266,001.
Patented Oct. 17, 1882.
14 Sheets—Sheet 6.
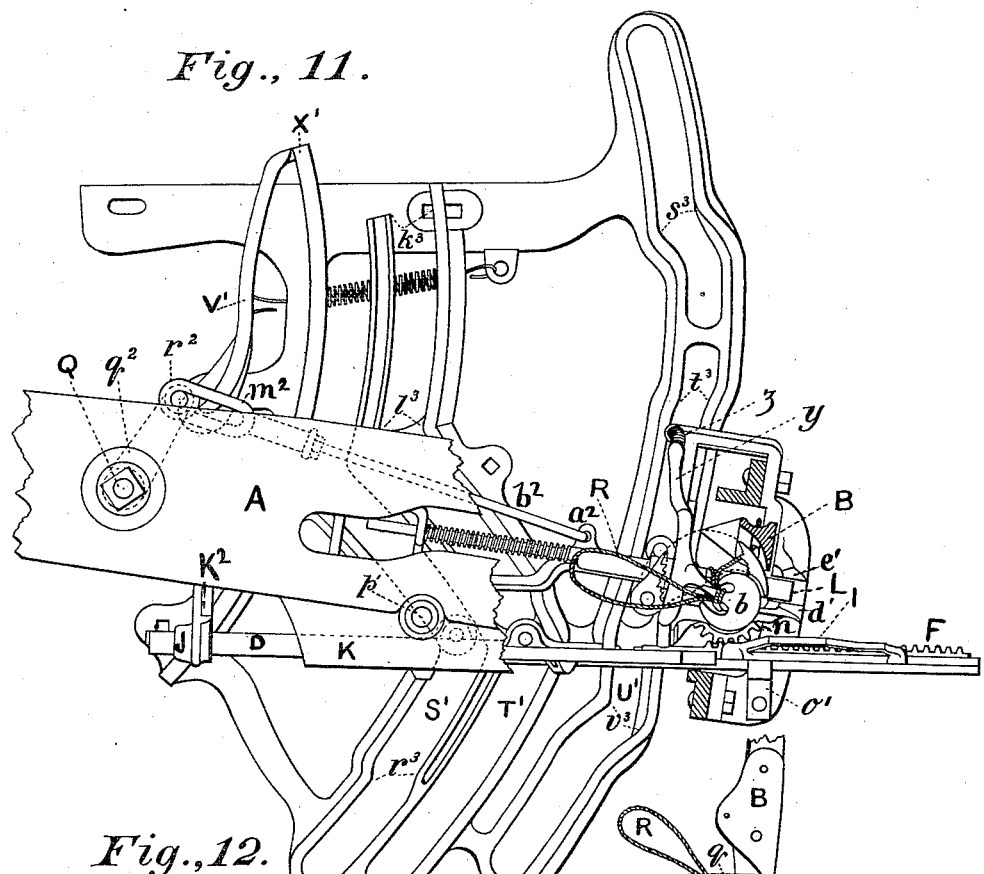
Fig., 11.
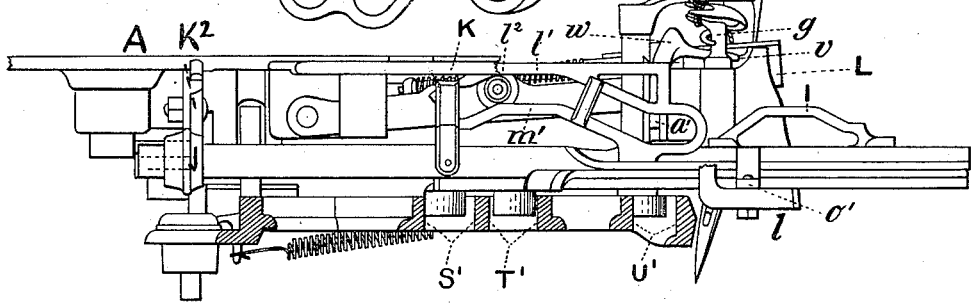
Fig., 12.
Witnesses:
John C. Center
Alex Mahon
Inventor:
C. Wheeler Jr.
by A. M. Smith
Attorney.

(Model.)

C. WHEELER, Jr.
GRAIN BINDER.

No. 266,001. Patented Oct. 17, 1882.

Witnesses:
John G. Center
Alex Mahon

Inventor:
C. Wheeler Jr.
by A. M. Smith
Attorney (Model.)  
C. WHEELER, Jr.  
GRAIN BINDER.  
No. 266,001. Patented Oct. 17, 1882.
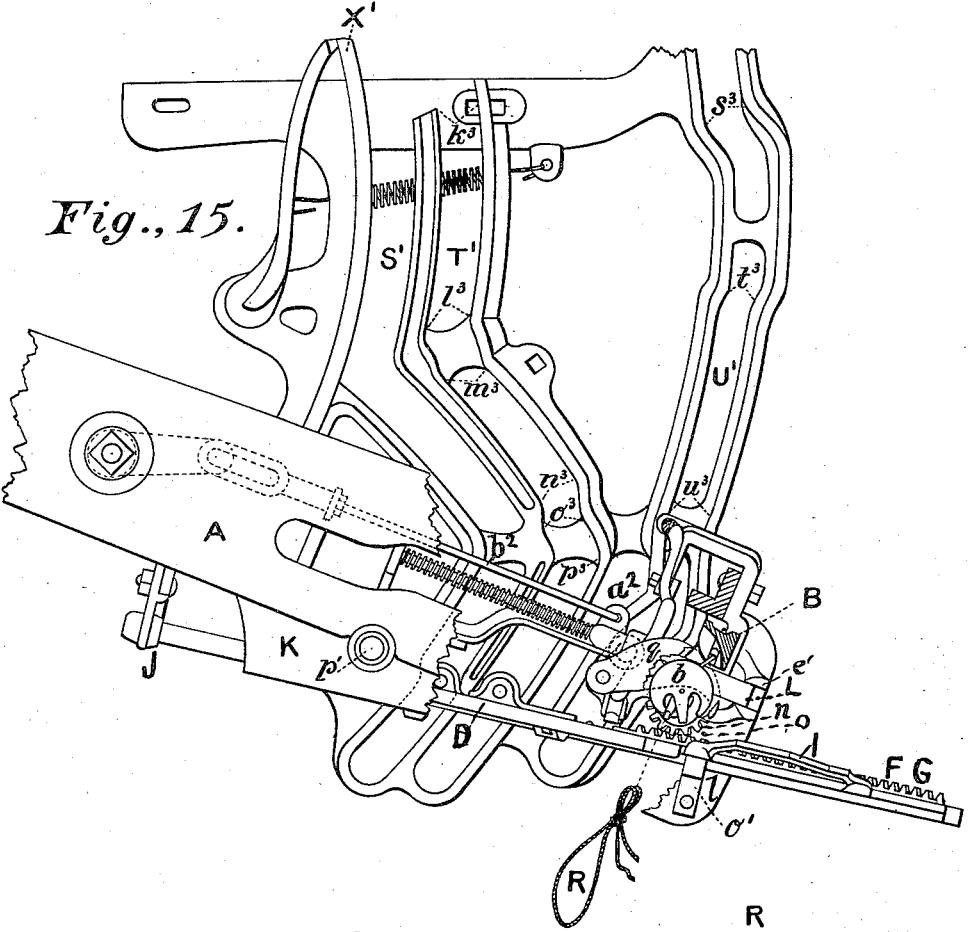
Fig., 15.
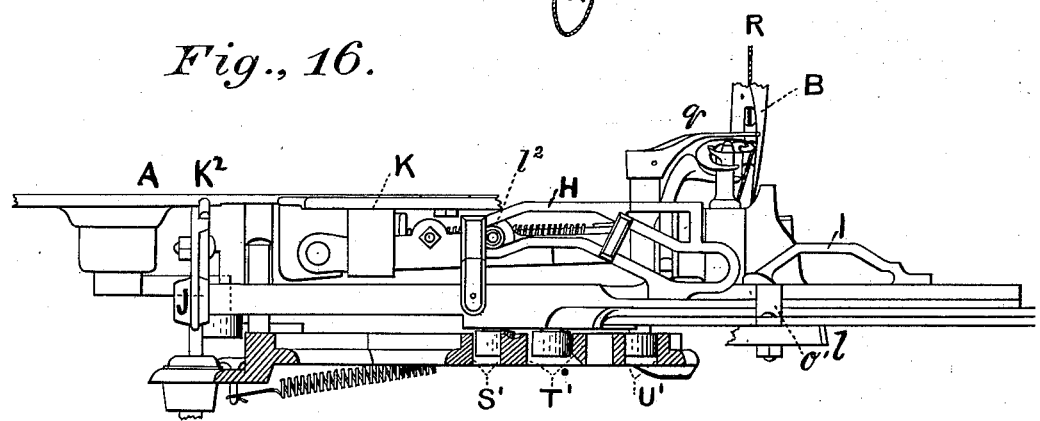
Fig., 16.
Witnesses:  
John G. Center  
Alex Mahon
Inventor:  
C. Wheeler Jr.  
by S. M. Smith  
Attorney (Model.)
C. WHEELER, Jr.
GRAIN BINDER.
No. 266,001. Patented Oct. 17, 1882.
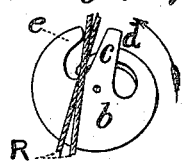
Fig., 17.
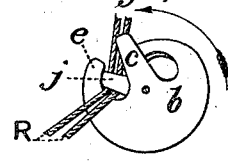
Fig., 18.
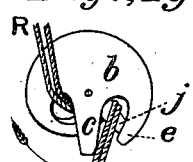
Fig., 19.
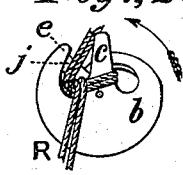
Fig., 20.
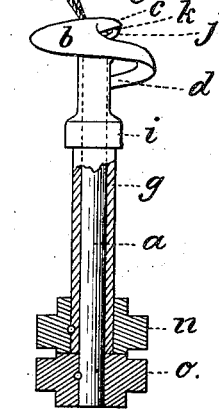
Fig., 21.
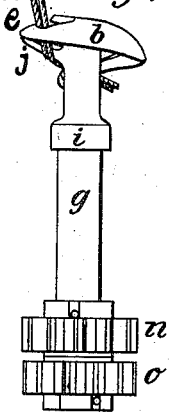
Fig., 22.
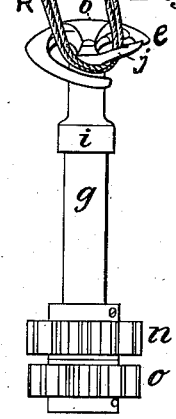
Fig., 23.
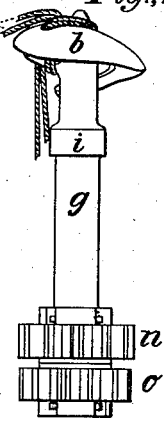
Fig., 24.
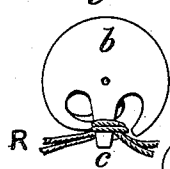
Fig., 25.
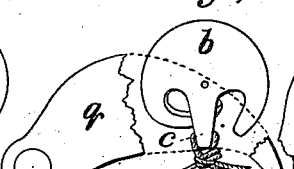
Fig., 26.
Fig., 27.
Fig., 28. Fig., 29.
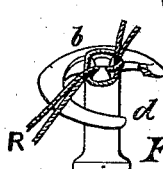
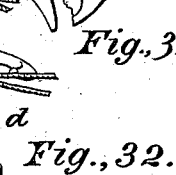
Fig., 31.
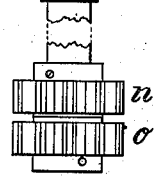
Fig., 30.
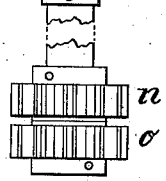
Fig., 32.
Witnesses:
John G. Center
Alex Mahon
Inventor:
C. Wheeler Jr.
by A. M. Smith
Attorney (Model.)
14 Sheets—Sheet 10.
C. WHEELER, Jr.
GRAIN BINDER.
No. 266,001.
Patented Oct. 17, 1882.
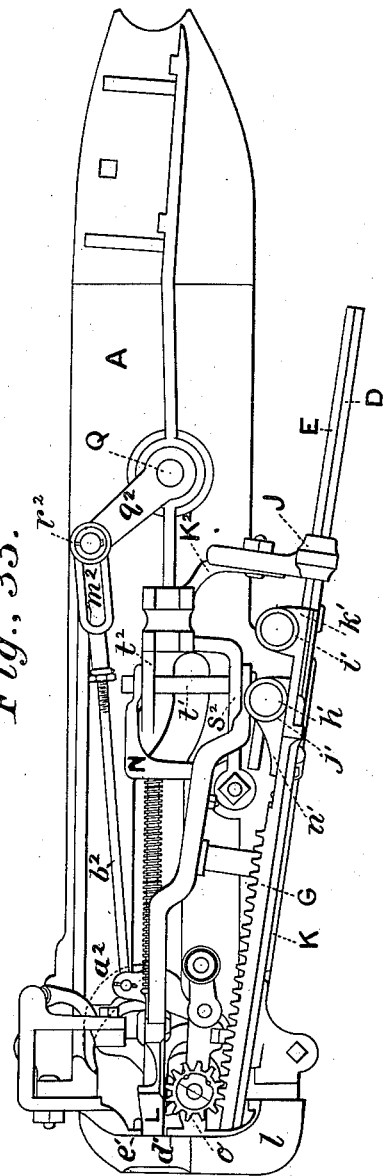
Fig., 33.
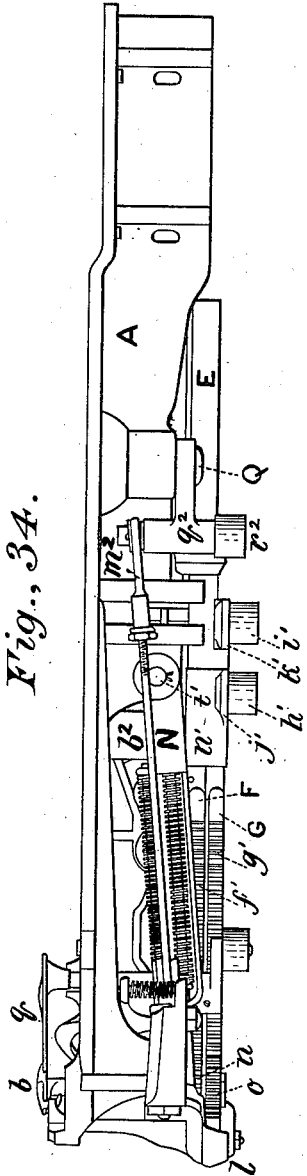
Fig., 34.
Witnesses:
Inventor:

(Model.)
14 Sheets—Sheet 11.
C. WHEELER, Jr.
GRAIN BINDER.
No. 266,001. Patented Oct. 17, 1882.
Fig., 35.
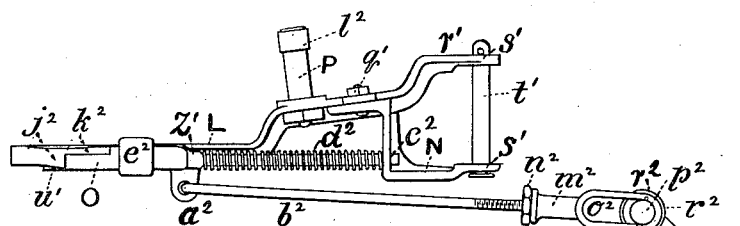
Fig., 36.
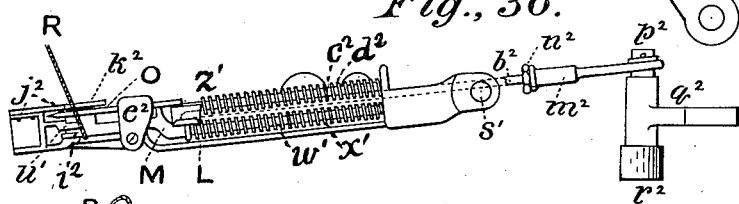
Fig., 37.
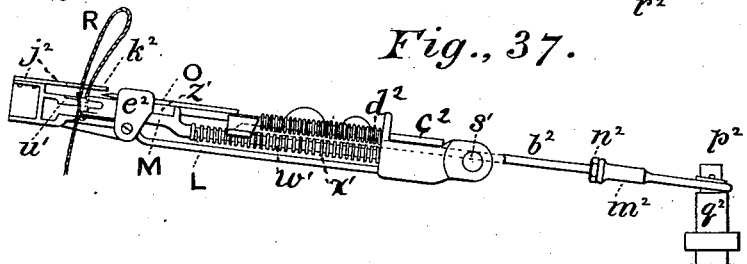
Fig., 38.
Fig., 39.
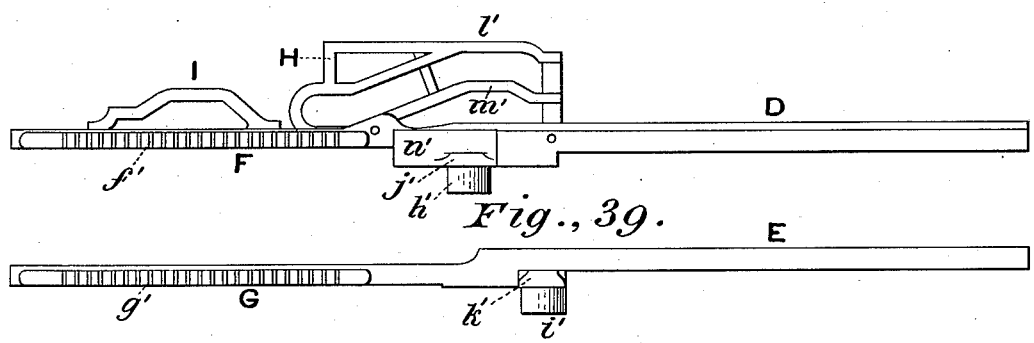
Witnesses:
John W. Carter
Alex Mahon
Inventor:
C. Wheeler Jr.
by A. M. Smith
Attorney.

(Model.)
14 Sheets—Sheet 12.
C. WHEELER, Jr.
GRAIN BINDER.
No. 266,001.  Patented Oct. 17, 1882.
Fig: 40.
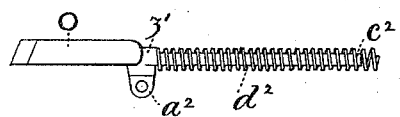
Fig., 42.
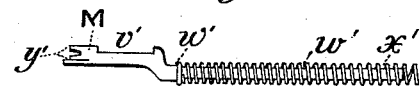
Fig., 41.
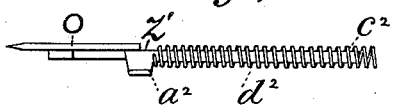
Fig., 43.
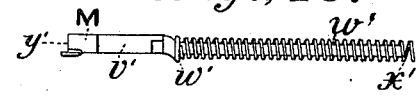
Fig., 44.
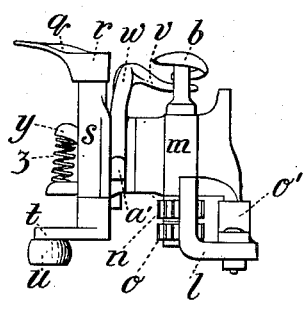
Fig., 45.
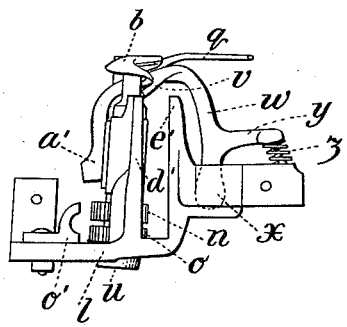
Fig., 46.
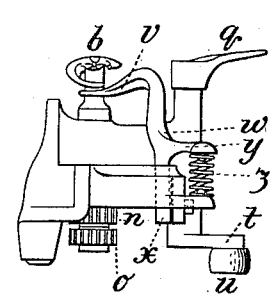
Witnesses:
John G. Carter
Alex Mahon
Inventor:
C. Wheeler Jr.
by A. M. Smith
Attorney.

(Model.)
C. WHEELER, Jr.
GRAIN BINDER.
No. 266,001.
14 Sheets—Sheet 13.
Patented Oct. 17, 1882.
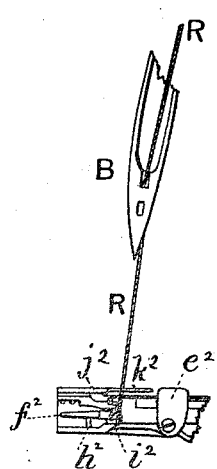
Fig., 49.
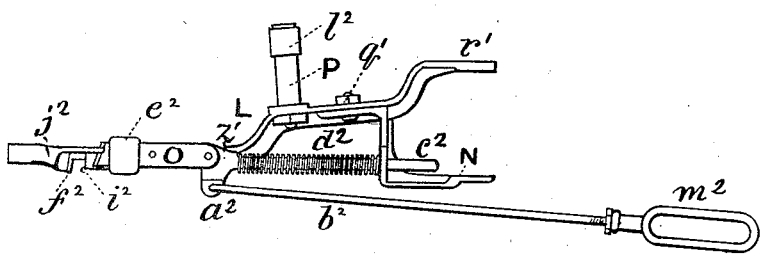
Fig., 47.
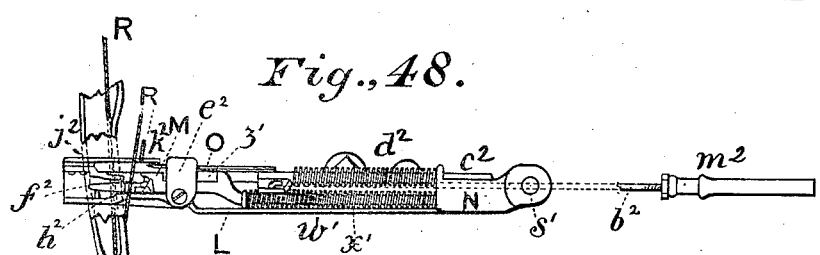
Fig., 48.
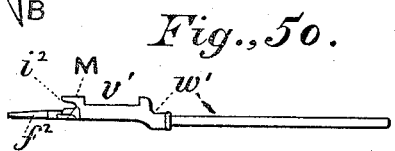
Fig., 50.
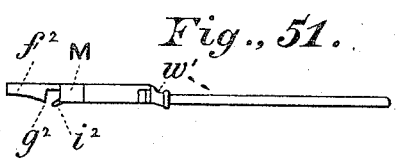
Fig., 51.
Witnesses:
John G. Center
Alex Mahon
Inventor:
C. Wheeler Jr.
by A. M. Smith
Attorney (Model.)
C. WHEELER, Jr.
GRAIN BINDER.
14 Sheets—Sheet 14.
No. 266,001.
Patented Oct. 17, 1882.
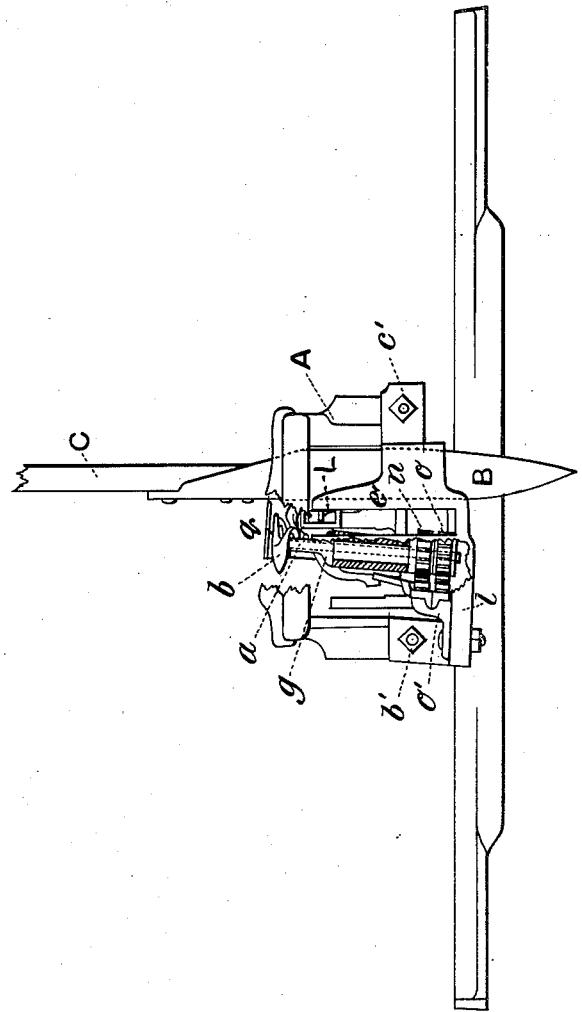
Fig., 52.
Witnesses:
John G. Carter
Alex Mahon
Inventor:
C. Wheeler Jr.
by A. M. Smith
Attorney

UNITED STATES PATENT OFFICE.

CYRENUS WHEELER, JR., OF AUBURN, NEW YORK.

GRAIN-BINDER.

SPECIFICATION forming part of Letters Patent No. 266,001, dated October 17, 1882.

Application filed January 11, 1881. (Model.)

*To all whom it may concern:*

Be it known that I, CYRENUS WHEELER, Jr., of Auburn, county of Cayuga, and State of New York, have invented certain new and useful Improvements in Harvesters and Binders; and I do declare that the following is a full, clear, and exact description of the construction and operation of the same, reference being had to the accompanying drawings, making a part of the specification, in which—

Figure 13:
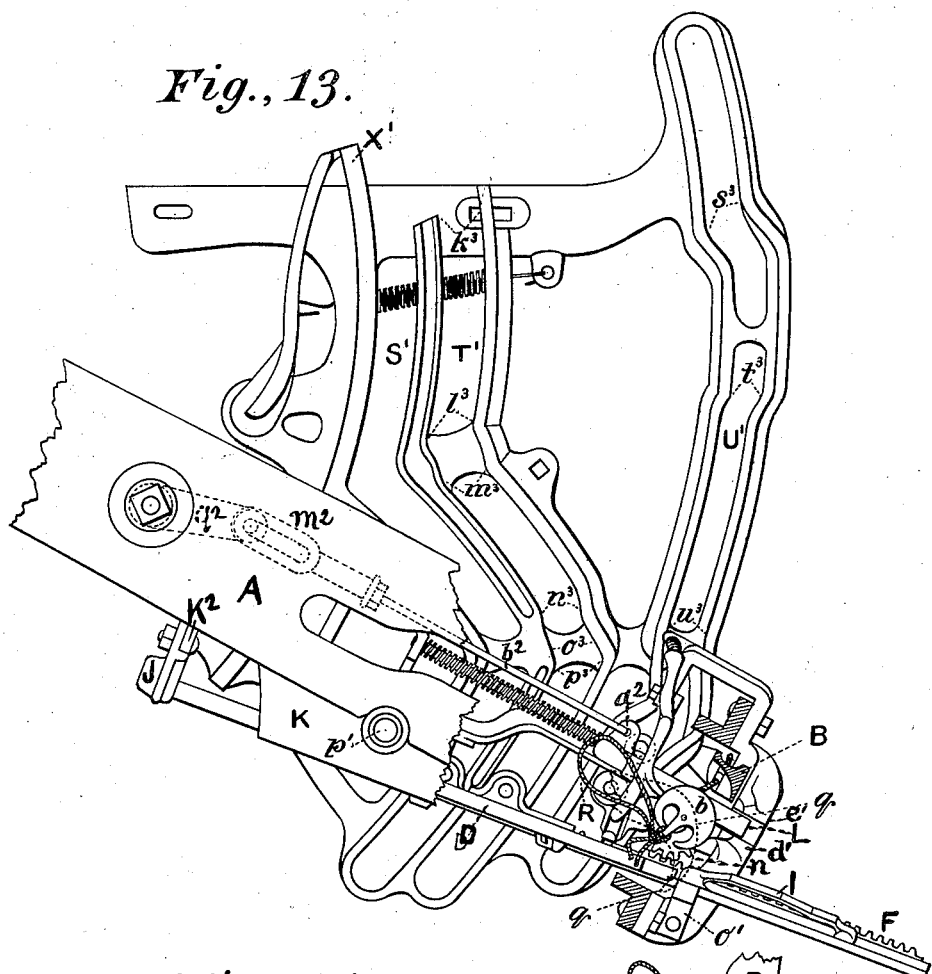

Figure 1 is a side view of the binder devices as they appear applied to a harvester. Fig. 2 is a side view of the binding mechanism detached from the harvester, the binding-table being removed to give a better view of the working parts, showing also a part of the harvester-timber to which the binder-frame is connected. Fig. 3 is a plan view of the cam-frame with switch and spring connected thereto. Fig. 4 shows an edge or side view of the switch removed from the cam-frame. Fig. 5 is a top view of the knotter shield-plate. Fig. 6 is an edge view of the same. Fig. 7 is a plan or top view of that part of the vibrating arm which supports the knotting devices, a portion being broken away to show the parts below; also showing the cam-frame. Fig. 8 is a view of the same parts, taken from the outer side of the machine, a portion of the cam-frame being broken away to show the friction-rollers, the devices in both Figs. 7 and 8 being in position for the knotter jaws or fingers to close on the cord. Fig. 9 is a top view, and Fig. 10 a side view, of the same parts with the knotter jaws or fingers closed on the cords, the knotter having made a partial revolution and the knotter-arm having advanced a stage forward. Fig. 11 is a top view, and Fig. 12 a side view, of the same, showing a further advance of the knotter-arm, the cords being crossed and the jaws of the knotter closed on them. Fig. 13 is a top view, and Fig. 14 a side view, of the same at another stage of advance, showing the cord pushed off of the jaws and the knot formed. Fig. 15 is a top view, and Fig. 16 a side view, of the same, showing the completed stage with the bundle discharged. Fig. 17 is a top view, and Fig. 21 an elevation, of the knotter with the cords in position. Fig. 18 is a top view, and Fig. 22 an elevation, of the same, showing the jaws closed on the cords. Figs. 19 and 23 are similar views of the same, showing its appearance at a half-revolution. Figs. 20 and 24 are similar views of the same, showing its appearance at a full revolution with the cords crossed. Fig. 25 is a top view, and Fig. 30 an elevation, showing the knotter as it appears after one and one-half revolutions, with the cord ready to be pushed off of the jaws to form the knot. Figs. 26 and 32 show the cord pushed off and the knot completed. Fig. 27 shows the position of the knotter-jaws after the completed knot and band are discharged. Fig. 28 shows upper knotter-jaw, and its spindle and pinion. Fig. 29 shows the under jaw or finger and the hollow spindle with its pinion. Fig. 31 is a completed band. Fig. 33 is a plan view of the under side of the knotter-arm and the devices connected therewith. Fig. 34 is an edge view of the same arm, looking at it from the inner side. Fig. 35 is a top view of the cord-holder and its operating lever and link detached from the arm. Fig. 36 is an outer edge view of the same at its lowest position. Fig. 37 is the same at its most elevated position. Figs. 38 and 39 show detached views of the racks, taken from the inner side. Fig. 40 is a top view of the cutter and spring. Fig. 41 is an edge view of the same. Fig. 42 is an edge view of the movable jaw and spring detached from the cord-holder. Fig. 43 is a top view of the same. Fig. 44 is a view of the knotter and cord-finger, taken from the outer side of the machine. Fig. 45 is an end or front view of the same. Fig. 46 is a view of the same from the inner side. Fig. 47 is a plan or top view of the cord-holder and its link with the cutter and jaws open. Fig. 48 is an edge or inner side view of the same with the needle and cord in position. Fig. 49 is a similar view of the forward end of the same with cutter and jaw closed and needle up, with cord in position. Fig. 50 is an inner side view of the movable jaw of the cord-holder. Fig. 51 is a top view of the same. Fig. 52 is a front end view of the knotter-carrying arm and knotter-stand, parts being broken away to show the knotter and pinions. It also shows the needle and a part of the cam-frame.

In the construction of the several parts of this machine and the combination of the same for the performance of their several functions I provide a spindle, a, Fig. 28, and firmly attach to one of its ends a cap-piece or head, b, having a rigid finger, c, projecting from the spindle, and inclined outward and upward, so as to form an obtuse angle between the under side of the finger and the spindle. This finger is made tapering from its root to its point, serving, with the inclination of the finger, to discharge the cord-loop in the formation of the knot, as will hereinafter be described. The cap-piece or head b is made convex on its upper surface, and has an inclined or spiral wing, d, which, with the convex head, serves to carry the cords smoothly and easily across the finger c. With the cap or head b is formed a finger, e, the outer edge of which is in the arc of a circle of which the spindle a is the center. The under side of the end of this finger e is in the same horizontal plane as the under side of the end of the finger c. The inner edge of this finger e is curved, so as to form between it and the adjacent finger c an opening, f, in which and against the finger e the two strands of cord are held by the finger or jaw of the other spindle, as will hereinafter be explained.

A hollow spindle, g, Fig. 29, is provided for receiving the spindle a. This hollow spindle has a collar, i, formed on it, which serves, in connection with its pinion, when in its stand, to prevent end-play. A finger, j, projects from the upper end of the hollow spindle, and is inclined so as to form an obtuse angle with the axis of the latter, and has formed on the upper surface of its projecting end a short tooth or lug, k, which, in connection with the fingers c and e on the spindle a, serves to hold the ends of the cord, as will be explained hereinafter. The spindle a is free to rotate within certain limits independent of the hollow spindle g, and the latter is free to rotate within certain limits independent of the former. To support these spindles, a stand, l, (see Figs. 44, 45, and 46,) having a bearing, m, is provided, in which bearing the spindles are inserted. To rotate the hollow spindle, a toothed pinion, n, is keyed fast to its lower end, below the bearing m. A corresponding pinion, o, is fastened to the lower end of the central shaft, a, close to the pinion n. The fingers of the two spindles will, by a partial rotation of the spindle g, assume the position shown in Figs. 18 and 22. The end of the finger j stands under the end of the finger e, the two strands of the cord R being held between them. A reverse movement of the shaft g returns them to their first position. A partial rotation of the shaft a will bring the fingers into the position shown in Fig. 27. These shafts not only have rotations independent of each other, but a rotation together, as will hereinafter be described.

In order to bring the cords within reach of the knotting-fingers c, e, and j and hold them within their grasp, and to aid in completing the knot, as well as to protect the fingers from entanglement with the cord on the return movement after the discharge of the bundle, a cord-finger, q, Figs. 26, 27, 44, 45, and 46, is provided, its form being shown in plan in Figs. 7, 26, and 27. This finger is provided with a spindle, r, to one end of which it is firmly fixed. This spindle is supported in a bearing, s, carried by the stand l, and to its lower end is fastened a short lever, t, having a roller, u, pivoted to the lower side of its projecting end, the spindle being free to turn in its bearings, the hook q and lever t swinging with it, the hook being located so as to sweep over the fingers c, e, and j.

To guide the cord over the wing d and cap b of the knotter-shaft a, a guide-finger, v, Figs. 8, 10, 44, 45, and 46, is provided. This finger is fastened to the top of an arch-shaped lever, w, and projects at right angles from it. This lever is pivoted at x to the stand l, and has a short arm, y, projecting from it above the pivot, and a spring, z, between said arm and a seat on the stand, which spring serves to keep the opposite end, a', of the lever pressed down and forward.

To support and carry the knotter-stand l and its several parts, as heretofore described, an arm, A, is provided, to which the stand l is bolted by bolts b' and c', as shown in Fig. 52, which is an end view with portions broken away to show the position of the knotter-spindles a and g and their pinions n and o. The spindles are inclined inward at their upper ends and toward the needle B of the binder-arm C, which will be hereinafter described. The knotter-stand l has guide-pieces d' and e' connected with it, which rise vertically from it and stand parallel to each other and at right angles to a horizontal line crossing the arm A, which guide-pieces serve to steady and guide the end of the cord-holder, as will be hereinafter described.

To give to the knotter-spindles the necessary rotation, racks F and G are provided having extension-pieces D and E, and each having cogs or teeth f' and g'. They have rollers h' i', pivoted by vertical pivots to the under side of ears j' k', located near the center of their length. The rack-piece F has connected with it a cam-piece, H, which has ways l' m', the inner walls of which are parallel to each other and of the form shown in Fig. 38, being parallel to the rack in places and in others inclined to give the necessary vertical movements to the cord-carrier at the proper time, as will be hereinafter described. A second cam-piece, I, is provided, consisting of a single rail or track located over the toothed end of the rack-piece F, and of the form shown. This serves to raise and lower the lever w and cord-guide, as will hereinafter be described. These rack-pieces F G are placed together, F on top of G, and with their extensions D E parallel to each other, side by side, as seen in Figs. 15, 16, 33, and 34. A flange or lip, n', to which the ear j' is attached, to bring the roller h' attached to it down in line with the roller l', laps over E on the toothed side of it and aids in keeping the racks at this point together. The toothed ends of these rack-pieces are arranged on the arm A, so as to gear with the pinions $n$ $o$ on the knotter-spindles. These racks are arranged so as to slide horizontally in guide-pieces J, bolted to an ear, $K^2$, of the frame A. Another guide-piece, $o'$, is bolted to the knotter-stand $l$. A guide-piece, K, is also bolted to the arm A at $p'$. The racks, as will be seen by the drawings, are not arranged parallel to the vertical plane of the arm A or the line of its length, but diverge horizontally therefrom for the purpose of rendering the camways in their action upon the rollers of the rack-pieces more smooth and easy than they would be with the racks arranged parallel to the vertical plane of the arm A, as will be more fully described hereinafter.

To hold the end of the cord, a holder, L M, is provided, as shown in Figs. 35, 36, 37, 47, and 48, Figs. 47 and 48 differing in some of the details of construction from that shown in the other figures, as will be explained. To the arm L of the holder, at $q'$, is bolted an ear-piece, N, which, with the ear-piece $r'$ formed on the end of the arm L, makes a forked or branched end, with a wide bearing for pivoting it to the arm A, as will hereinafter be described. A hole, $s'$, is provided in each of the ear-pieces for inserting the pivot-pin $t'$. At the opposite or forward end of the arm L of the cord-holder is formed a fixed jaw, $u'$, which stands out from the web or body of said arm. A movable jaw, M, is provided, as shown detached in Figs. 42, 43, with a recess or long notch, $v'$, across its upper face, with a downwardly-curved and rounded extension-piece, $w'$, for receiving a spring, $x'$. This movable jaw M is arranged in the holder so that its jaws $y'$ will close with the fixed jaw $u'$ on the body of the holder L. A cutter, O, for severing the cord is fastened to a carrier, $z'$, having an ear, $a^2$, with a hole in it for connecting the hook of a link-rod, $b^2$, the cutter-carrier having a rounded extension-piece, $c^2$, on which is placed a spring, $d^2$.

The cutter-carrier $z'$ is of a thickness slightly less than the depth of the recess $v'$ across the movable jaw M, and is notched on its edge, so that when the cutter is over the movable jaw M the carrier $z'$ will lie in the long notch or recess $v'$, and can be drawn back far enough to bring the edge of the cutter within the projecting teeth of the movable jaw below it before affecting the movable jaw, for purposes to be soon more fully explained. When the cutter and movable jaw are placed in the arm L with their rounded ends or extensions $c^2 w'$ inserted in holes made in the straight part of the ear N, in which they can slide freely, with the springs $x'$ and $d^2$ in place, the cap or guide piece $e^2$ is fastened to the arm L and keeps them in working position.

In Figs. 47, 48, 50, and 51 the jaws of the holder are different from those shown in Figs. 35, 36, and 37, as I will now explain. An extension-piece, $f^2$, is made on the movable jaw M. This extension is made with an incline on the under side from its connection with the opening $g^2$ upward and outward to its point. The lower tooth of the fixed jaw $u'$ is cut away, making an opening for this extension-piece to slide through, and a bearing-piece, $h^2$, for the extension-piece $f^2$ to rest on and work over, is made in the fixed jaw L. Each of the movable jaws described has a tooth, $i^2$, which projects beyond the jaw, and over which the cord is drawn when the needle B is up, as shown in Fig. 49. The action of this extension-piece in connection with the movable jaw and fixed jaw is as follows: As the force of the springs brings the jaws of the holder together the cord is gripped between them, and the incline of the extension-piece, in connection with the bearing-piece $h^2$, tends to throw or force the movable jaw upward against the fixed jaw with a vise-like grip. As the needle B rises (see Fig. 49) the cord is drawn across the projecting tooth $i^2$, the upward strain on the cord also tending to draw the movable jaw against the fixed jaw. With the movable jaw opened to its full capacity, the widened or inner end of the extension-piece $f^2$ is drawn back beyond the fixed jaw and carries with it any fibers or pieces of cord or straw that may be carried in in its forward movement. In Figs. 35, 36, and 37 the holding of the end of the cord depends upon the pressure of the spring, mainly. In all of the figures the pressure of the spring on the knife is added to that of the spring of the movable jaw to hold it firmly closed from the time the jaw first closes on the cord until the latter is passed over the bundle, this being the time in which the greatest tension is on the cord.

In order to insure the easy and perfect cutting of the cord by the cutter O, a lip-piece, $j^2$, is fastened on top of the outer end of the fixed jaw L, with space enough between it and the latter for the end of the cutter to slide freely, and so located in relation to the fixed jaw that the cord, when the cutter strikes it, will have a bearing against it above and against the fixed jaw below. To this lip-piece is attached a finger, $k^2$, which serves to prevent the cutter, the edge of which is ground at an angle, from crowding the cord back beyond the lip. As the cutter and movable jaw are both drawn back against the force of the springs by the link $b^2$ through its connections, the construction of the cutter-carrier and movable jaw and their connection being such as I have described, it will be seen that the cutter will first be drawn back until its carrier comes in contact with the elevation at the back end of the recess or opening $v'$, when its further movement carries with it the movable jaw until it is fully opened, as seen in Figs. 37, 47, and 48. When the link $b^2$ is released from the power applied to it the springs instantly close both the jaw and the cutter. The jaw first closes on the cord by reason of its being furnished with a stiffer spring, and because the cutter has farther to move in the same length of time by reason of its cutting-edge being drawn back farther than the end of the movable jaw. A stud, P, is secured to the side of the arm L of the cord-holder, and on its end is placed a friction-roller, $l^2$, so as to turn freely.

To the end of the link-rod $b^2$ is connected an eye-piece, $m^2$, which has a hole with a thread cut in it to engage the threaded end of the link, and has a jam-nut, $n^2$, for holding it firmly when adjusted to the desired length, to give the necessary opening to the jaws of the cord-holder. This eye-piece has a long link-shaped opening, $o^2$, for the purpose of giving the stud $p^2$ of the vibrating lever $q^2$ freedom to move in it, for purposes hereinafter described. The stud $p^2$ has on its lower end a friction roller, $r^2$.

The cord-holder with its connecting devices thus constructed is pivoted to the knotter-carrying arm A (see Figs. 33 and 34) by ears $s^2\ t^2$, formed on the lower side of the arm, the pivot-pin $t'$ passing through these ears and the ears N $r'$ of the cord-holder L M parallel to the horizontal plane of the arm and at right angles to its length. The outer end of the cord-holder is between the guide-pieces $d'\ e'$ of the knotter-stand $l$, heretofore described, (see Figs. 2, 7, 11, 33, and 45,) and is kept from lateral movement, while it can rise and fall freely in its vertical movements. By this arrangement it will be seen that the knotter-spindles $a\ g$ are inclined to the cord-holder, while the needle B, which is on the other side of it, is parallel to its vertical plane. (See Fig. 52.) The function of the cord-holder being not only to hold the end of the cord, but to feed it to the knotter-fingers in forming the knot, as well as release the cord at the proper time and seize the cord that extends from the eye of the needle to the knotter-fingers, preparatory to its being severed for the completion of the knot and discharge of the same from the fingers, the importance of having the jaws of the cord-holder move in close proximity to the needle will be apparent when it is seen that the jaws of the cord-holder at the time of closing on the cord of the needle, after releasing the end, are some distance below the knotter-fingers, as will be hereinafter explained in connection with the camway for raising and lowering the cord-carrier. With the cord-holder thus connected with the arm, the roller $l^2$ on the projecting stud lies between the camways $l'\ m'$ of the cam-piece H on the rack-piece F. The reciprocating movement of the rack-piece carries with it the cam-piece H, the roller $l^2$ rising and falling according to the varying inclination of the ways $l'\ m'$, carrying with it the stud P and cord-holder L, the cord-holder oscillating on its pivot $t'$.

Figure 14:
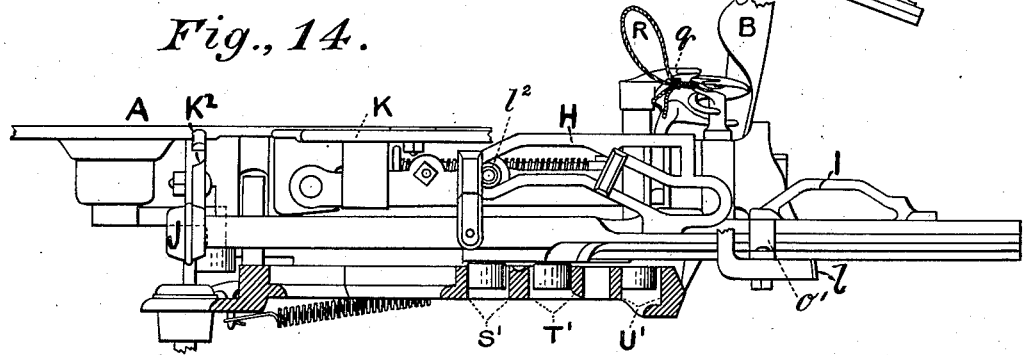

Figs. 7 and 8 show the roller $l^2$ at the outer end of the ways, just before the rack-piece F begins its forward movement, the cord-holder L M being at its lowest point. Figs. 9 and 10 show the rack moved forward its first stage, a partial revolution of the knotter-spindle having been made, the finger $j$ having closed on the cord R, and, with the finger $e$, holding it securely grasped, the cord-holder still remaining at its lowest point. Figs. 11 and 12 show another stage of the rack's movement, the knotter-spindles having made a complete revolution, the cords, having crossed the fingers $j$ and $c$, now being closed on the same, and the roller $l^2$ being at its highest elevation and at the point to begin its downward movement. In this position the cord-holder is at its highest point. Figs. 13 and 14 show another stage of the rack's progress, the knotter-spindles having made about a quarter of a further revolution, the knot being completely formed, its loop yet remaining fast between the fingers, the roller $l^2$ being at the lowest part of the short incline and the cord-holder about midway its highest and lowest points, the end of the cord having been released by the opening of the jaws of the cord-holder and drawn out by its descent, and the jaws having closed again on the cord in the needle, it having been severed from the knot at a point just above the jaws of the cord-holder. Figs. 15 and 16 show another and the last stage of the rack's movement, which is made by the lower rack-piece, G, moving forward to carry the finger $c$ around far enough to release the short loop of the knot of the completed band. The rack-piece F in this last stage remains stationary, as do also the roller $l^2$ and the cord-holder L M. A reverse movement of the racks will return the knotter-fingers and cord-holder to their original position.

To give the necessary motions to the cutter and movable jaw of the cord-holder, the lever $q^2$ is pivoted to the under side of the arm A at Q. (See Figs. 33 and 34.) To the top of the arm, at its outer or forward end, is bolted a shield-plate, S. This plate has an opening for the needle to pass down through, with an enlarged slot for guiding the cord and an opening, $u^2$, for the point of the cord-finger $q$ to work through, and serves also to shield the cord-finger and knotting-fingers from loose straws. (See Figs. 1, 2, 5, and 6.) The arm A is bolted to a flange-piece, $v^2$, on the vertical rock-shaft T by bolts $w^2$, $x^2$, and $y^2$, so as to stand at right angles to said rock-shaft. This rock-shaft is supported in bearings on a frame, , which is in turn supported on a guide-piece, $z^2$, on the side beam, V, of the harvester-frame, (see Figs. 1 and 2,) the upper part of the frame U being held by a similar guide on a similar beam. (Not shown.) To the top of this vertical rock-shaft T is pivoted the binder-arm C by the pivot $a^3$. The other end of the binder-arm has a needle, B, which has near its point an opening, $b^3$, in which is pivoted two friction-rollers, between which the cord R passes. A sheave, $c^3$, is located at the bend of this arm. A tension-sheave, $d^3$, having a screw and thumb-nut and a spring, (not shown,) is located on the arm a short distance back of the bend. Another sheave is located on the vibrating take-up W, which is pivoted to the top of the pitman-extension X, and has a spring, Y, connected with it.

To the lower end of the vertical rock-shaft T is pivoted, at $e^3$, one end of a lever, Z, its other end being pivoted to the gear-wheel A' just inside of its toothed rim. This gear-wheel is supported in a tubular bearing, $f^3$, of the frame U.

To the lever Z, near its connection with the gear-wheel, is pivoted the lower end of the pitman B', which is pivoted at $g^3$ to the arm C.

The gear-wheel A' is made to turn in an upward and inward direction by means of a pinion (not shown) gearing with it, and located on a shaft, $h^3$, which is supported at one end in the post C' of the harvester-frame, its other end being supported in a corresponding post, and having on that end, near the post, a sprocket-wheel, which connects by means of a chain-band with a smaller sprocket-wheel on the crank-shaft, which, through an ordinary train of gearing, receives its motion from the main supporting or drive wheel D' of the harvester. On this supporting-wheel is carried the main part of the harvester proper, as well as the binding devices, and all of the operative parts receive their motions from it, a grain or small supporting wheel being arranged at the opposite end of the machine.

As the harvester-machine is substantially like many of the harvesters in use at the present day, it is unnecessary to describe more of it than is necessary to a clear understanding of such parts as are directly connected with the binding devices. The location of the binding devices is on the stubble side of the main wheel and below and at the outer side of the delivering ends of the elevating-aprons E' F', as shown in Fig. 1, the cutting apparatus and the carrying-apron being located on the opposite side of the wheel D'.

A grain receiving or binding platform, G', is supported at the front end by an arm projecting from the frame of the harvester, and at the rear end by a knee-piece, H', bolted to it and to an ear of the bearing of the vertical rock-shaft. This platform is above the horizontal knotter-carrying arm A and parallel thereto, and below and at the outer side of the aprons E' F'. Being connected to the binder-frame, it can be moved with the same on the guide-piece $z^2$ forward or back by means of a hand-wheel, I', and shaft J', having a pinion engaging with a rack on the binder-frame U to bring the band around the bundle at a proper distance from its butts. An opening, K', is made through the table in the arc of a circle of which the vertical rock-shaft is the center. In the vibration of the arm A the knotter shield-plate S traverses this opening. Brackets L' M' N' are connected with the table and rise above it, having their tops united by an inclined shield, O', over which and down the outer side of the brackets the grain falls as it is discharged by the aprons E' F', they serving as a stop against which the grain is pressed in forming the bundle, and between two of which the needle B descends in separating it from the falling grain, the separator-rods P' and Q' aiding the operation.

To impart the necessary reciprocating motions to the rack-pieces F and G and operate the cord-finger $q$ at the proper time and manner, as well as to open the cutter and cord-holder, a cam-frame, R', is provided, having holes $i^3 j^3$ for bolting it to the top of the binder-frame U. Ears $B^2 C^2$ are formed on the frame, having holes for bolting braces $D^2 E^2$ to it. (See Figs. 2 and 3.) When placed in position on the binder-frame it is just below the knotter-carrying arm A and parallel to its plane of oscillation. This frame has three camways formed in it—two for the rollers $h'$ $i'$ of the rack-pieces and one for the roller $u$ of the cord-finger lever. The circular rail X' serves as a track for the roller $A^2$, which has its support in bearings on the knotter-arm A. This rail also, for a portion of its length, forms one of the sides of the camway S'. The rear camway, S', is for controlling the roller $i'$ on the lower rack, G. The adjoining camway, T', is for controlling the roller $h'$ on the upper rack-piece, and the third camway, U', controls the roller $u$ on the lever at the bottom of the spindle of the cord-hook $q$. The walls of each camway are vertical and parallel to each other, sufficient space being left between them for their respective rollers to turn freely on their pivots. The camways S' and T' are so constructed that with the cam-frame bolted in its proper place on the binder-frame their walls from $k^3$ to $l^3$ will be in the arc of a circle of which the axis of the vertical rock-shaft T is the center. From $l^3$ to $m^3$ the camway T' is deflected outward enough to move the roller $h'$ and the rack F connected with it to close the under finger, $j$, on the cord, as seen in Figs. 9, 10, 18, and 22. From $m^3$ to $n^3$ the deflection outward of the walls of the camways S' and T' is sufficient to give nearly a complete revolution of both the knotter-shafts, they rotating together. From $n^3$ to $o^3$ the ways T' deflect inward, the roller $h'$ throwing the rack F back, so as to close the finger $j$ back under the finger $c$, so as to grasp the crossed cords between them, as seen in Figs. 11, 12, and 25. From $o^3$ to $p^3$ the ways deflect enough to finish the rotation of the knotter-spindles together, as seen in Figs. 13 and 14, in which figures the holders are carried somewhat beyond the point $p^3$ to the point where the cord-hook $q$ is brought into action and is in the act of pushing off the cord and finishing the knot, the hook $q$ being shown in dotted lines in Fig. 13. From $p^3$ to $q^3$ the walls of the camways S' T' are in the arc of a circle of which the rock-shaft T is the center. This gives a dwell in the rotation of the knotter-shafts, which allows time for the cord-finger $q$ to perform its office, as will be soon explained in connection with its special camway. At $r^3$ the camway S' is deflected forward or outward. This portion of the cam acting upon the roller $i'$ moves the latter outward, carrying with it the lower rack, G, which rotates the internal knotter-shaft, $a$, and moves the finger $c$ around toward the front and away from the finger $j$. (See Figs. 15, 16, and 27.) This leaves the completed knot free, and the weight of the bundle draws it away. This position of the knotter-finger is preserved until the movement of the arm A outward is completed and it has on its return movement reached the same point again. It will be seen that the camway S' has but one point of deflection, in which its roller moves independent of the other in the cam T'. The cord hook or finger $q$, operated by the camway U', has four separate and distinct movements imparted to it during the movement of the arm A outward. At $s^3$ the hook $q$ brings the cord to the knotter-finger. At $t^3$ the cord-finger, having seized the cord, moves slightly back to give room for the cord to cross over the finger. At $u^3$ it moves forward and pushes off the loop that forms the knot, its point passing through the opening $u^2$ in the shield-plate S. At $v^3$ it again moves back to give room for the discharge of the completed knot, remaining in this position until the roller $u$ that works the cord-hook again meets this deflection on its return movement. In the return movement this arrangement and operation of the cord-hook serves another important purpose—that is, protecting the knotter-fingers from entanglement with the cord, which, being extended from the raised needle to the cord-holder below the shield-plate, the accumulated grain on the platform tends to press back. As the knotter-shafts have a rotation in reverse direction on the return movement, the knotter-fingers would, unless provision were made for it, catch and wind up the cord. This is prevented by making the hook wide and rounding it off at its back edge, as shown, so that it will effectually cover the knotter-fingers, and at the same time, in moving back against the pressure of the cord, operate easily. This hook, it will be seen, retains its position over the knotter-fingers until their shafts have ceased to rotate on the return movement.

To operate the cutter and movable jaw of the cord-holder, a switch, V', is pivoted by a vertical pivot to an ear, W', on the cam-frame R', the inner or movable end of the switch resting against the curved rail X', in which position it is held by a spring, Y', one end of which is connected to an ear on the lower side of the switch and the other to an ear, Z', on the cam-frame. This switch V' is so located on the cam-frame that the roller $r^2$ on the lever $q^2$, which is pivoted to the arm A at Q, Figs. 2, 7, 33, and 34, will, on the outward movement of the arm A, travel along the rear side of the switch, and on the return movement will pass on the front or inside of the same, the spring Y' yielding and permitting the roller to pass between it and the end of the curved rail X'. Its operation will now be explained in connection with the other parts of the machine. The cord R is carried in a box, $F^2$, supported by the binder-frame, and extends from the box through a guide, $G^2$, to the guide $H^2$ on the binder-arm C, then around the tension-sheave $d^3$, thence back to and around the sheave in the vibrating take-up W, thence forward over the sheave $c^3$, and down to and through the opening $b^3$, and between the sheaves in the needle-point, and down through the opening in the shield-plate S to and between the jaws of the cord-holder, by which its end is held. With the needle B descending, as shown in Figs. 1 and 2, the machine is at the stage of its movements in which the cord is being placed around the accumulated grain on the platform G' to form the bundle and separating it from the grain that is falling from the aprons E' F'. When the needle has nearly reached its lowest point and the arm A has commenced its outward vibration, as shown in Figs. 7 and 8, the cord is over the bundle, the strand in the cord-holder and under the bundle being pressed outward and in between the fingers $c$ and $e$, and the strand leading through the needle-eye and over the bundle lies in the curve of the needle. At this point the roller on the bottom of the cord-hook $q$ meets the first incline in the camway and the hook closes in over the knotter-fingers, carrying with it the strand that is over the bundle and placing it with the other strand of the cord between the fingers. It will be seen by reference to Fig. 7 that the roller $r^2$ has advanced along the rear side of the switch V', and, through the link $b^2$ connecting it with the cutter, has begun to draw back the cutter O, which will be drawn back beyond the opening of the jaws before the knotter-shafts commence rotation, thus avoiding injury to the cord. The movement of the arm now brings the roller $h'$, connected with the upper rack, F, against the first deflection, $l^3$, of the camway T', and the hollow knotter-spindle is rotated far enough to close the finger $j$ under the end of the finger $e$, as seen at Figs. 9, 10, 18, and 22, holding the two strands of the cord R firmly. Immediately afterward the spindles of the knotter begin to rotate together. At the same time the end $a'$ of the lever $w$, carrying the cord-guide $v$, is struck by the camway I on the upper rack, F, which raises the cord-guide, and with it the cords which are stretched across it, guiding them over the spiral wing $d$ of the knotter, and the cord-holder is raised by the cam-piece H on the rack acting on the roller $l^2$. The cord-holder continues to rise and the knotter-spindles to rotate until one revolution is made, the cord-holder being brought to its greatest elevation. The two strands of the cord are carried over the head $b$ of the knotter and crossed, as seen in Figs. 11 and 12, and the fingers $j$ and $c$ closed on it, gripping it firmly between them. The point of crossing and the appearance of the cords just preceding the closing of the finger on them will be best understood by referring to Fig. 20. Just before the rotation of the knotter-spindles brings the cords into the position for crossing and entering between the fingers $j$ $c$ the camway I has passed beyond the outer end, $a'$, of the lever $w$, carrying the guide-finger $v$, and it is forced outward by its spring and lies between the spindle $g$ and the end of the cord-holder L, thus permitting the cord-holder to carry the end held by it close to the knotter-fingers. At this point the roller $r^2$ has reached the full part on point of the switch V', where it has a short incline backward, and is thrown quickly to the rear, opening the movable jaw M of the cord-holder L, as shown clearly in Figs. 37 and 48, this opening being effected by the cutter-carrier locking with the jaw M, as has been heretofore explained. As the jaws of the cord-holder open the roller $l^2$ descends the short incline of the walls $l'$ and $m'$ of the cam-piece H, and the end of the cord R is drawn out of its jaws as seen in Fig. 48. As soon as the end of the cord is drawn out of the jaws and above the path of the cutter O the roller $r^2$ passes off the switch V' and the recoil of the springs $d^3$ on the cutter and X' on the movable jaw forces the cutter and jaw forward, the jaw closing on the cord from the needle B and the cutter severing the same just above the jaws, both springs acting in conjunction. The spring on the jaw being the strongest and the cutter being drawn back beyond the jaw, as heretofore explained, the jaw closes on the cord before the cutter reaches it, and is immediately followed by the cutter, which severs the cord. The force of the cutter's spring is added to that of the spring on the jaw, which increased grip upon the cord is held by the jaws until the cord is again passed around the bundle, when the cutter is again moved back, as has been heretofore explained. (See Fig. 49 for the position of the cord in the jaws after the same has closed and the needle raised.) Fig. 13 shows the jaws closed on the cord and another advancement of the arm to another point, when the knotter-spindles have rotated one-fourth of a turn more, bringing the fingers of the knotter in position for the cord-hook $q$ to come into action and push off the loop over the fingers and complete the knot, the action of which is clearly shown in Fig. 26. Figs. 15, 16, and 27 show the completed stage, the knotter-fingers being opened and the cord-hook $q$ dropped back to permit the free discharge of the knot, the weight of the bundle drawing it away. Sufficient space of time is secured by making all the camways parallel to each other from this point outward, the vertical rock-shaft being the center of their curves, giving a dwell or rest to the movements of the several knotting devices and cord-hook. On the return movement of the arm A all these parts are brought into action again in the reverse order, the needle, as it rises, bringing the cord which is fast in the cord-holder up back of the cord-hook, which remains over the knotter-fingers until the spindles of the knotter stop revolving, thus protecting the fingers from the cord, as heretofore described. In the return movement the roller $r^2$ passes on the front or opposite side of the switch V', the long opening, $o^2$, in the piece $m^2$, connecting with the link $b^2$, permitting it to do so.

Having thus described my invention, I claim—

1. The knotter-spindle provided with three rigid fingers, one of said fingers being made in the form of an inclined spiral wing, substantially as described.

2. The knotter-spindle having the convex-faced top or head and provided with three rigid fingers, one of said fingers being made in the form of an inclined or spiral wing, substantially as described.

3. The knotter-spindle provided with the convex-faced head, the straight radial finger inclined upward from its base, and the inclined spiral wing, arranged and operating substantially as described.

4. The knotter-spindle provided with the rigid inclined and tapering finger and a second finger curved on its outer edge in the arc of a circle of which the axis of the spindle is the center, and terminating at its outer end, with its lower face in the same plane with the lower face of the point of the straight inclined finger, substantially as and for the purpose described.

5. A hollow knotter-spindle having a fixed projecting finger at one end inclined upward and outward from its axis, in combination with an internal spindle having two rigid fingers, operating in connection with said hollow spindle and its finger, substantially as described.

6. A hollow knotter-spindle having a rigid laterally-projecting finger at one end inclined upward and outward from its axis, and provided at its outer end with a short lug or tooth, substantially as described.

7. In combination with the binder-arm, the knotter-carrying arm, and the cord-holder, the knotter-spindles arranged in a vertical plane passing transversely through the knotter-carrying arm and at an inclination to a vertical plane passing longitudinally through said arm, substantially as and for the purpose described.

8. The combination of the hollow knotter-spindle, the two-fingered spindle rotated therein, mechanism for giving to the former two motions independent of the latter, and mechanism for giving to the latter one motion independent of the former, substantially as described.

9. In combination with the knotter-spindle, the pivoted cord-guide, the straight reciprocating rack for operating one of the spindles, and the camway on said rack for raising the cord-guide, substantially as described.

10. In combination with the knotter-carrying arm, the knotter-spindles, the pivoted cord-holder, the independently-reciprocating racks for operating said spindles, and a cam way or track on one of said racks for raising and depressing the cord-holder, substantially as described.

11. In combination with the double knotter-spindle and its pinions, the straight independently-reciprocating racks for operating the same, all carried on a swinging arm, friction-rollers on said racks, and fixed camways on the binder-frame for operating the same, substantially as described.

12. In combination with the knotter-carrying arm, the knotter-spindles, and the reciprocating racks having friction-rollers, the fixed separate camways arranged in a horizontal plane below the knotter-carrying arm, said camways having vertical walls for receiving and guiding the friction-rollers, substantially as described.

13. The combination, with the knotter-carrying arm, of the knotter-spindles, arranged one within the other, and having separate actuating-pinions, the straight independently-reciprocating racks for actuating said pinions, and mechanism for operating the same, said racks being arranged on a line divergent from the center line of the knotter-carrying arm, substantially as described.

14. In combination with the knotter-carrying arm and its knotter-spindles, the vertically-vibrating cord-holder connected with said arm by a horizontal pivot, and a reciprocating rack provided with a camway for vibrating said cord-holder, substantially as described.

15. The combination, with the swinging arm carrying the band-securing mechanism, of the inclined knotter-spindles and the horizontally-pivoted vertically-oscillating cord-holder, arranged and operating substantially as described.

16. In a cord-holder, the movable jaw having a wedge-shaped extension on its end, in combination with a fixed jaw having an inclined bearing to receive said extension, substantially as described.

17. The pivoted cord-finger, inclined double-spindled rotating knotter, and a horizontally-pivoted vertically-oscillating cord-holder, all supported upon a horizontally-oscillating arm, and means for operating them, all arranged and combined for joint operation substantially as described.

18. The pivoted cord-finger having a short lever at the lower end of its pivot, provided with a friction-roller, in combination with a fixed cam-track having vertical side walls, substantially as and for the purpose described.

19. In combination with the binder-arm, the knotter, and the cord-holder, the cord-guide pivoted to the knotter-stand on the inner side of said knotter and holder, and the reciprocating rack on the outer side of the same, provided with a cam for operating the cord-guide, substantially as described.

20. In combination with the cord-guide, pivoted as stated, and the reciprocating rack, provided with a cam for operating said guide, a spring for keeping the foot of the guide in proper working relation to the cam, substantially as described.

21. The branched and pivoted vertically-oscillating cord-holder, the movable jaw and cutter, the connecting-link and pivoted lever, in combination with a pivoted switch on the horizontal binder-frame, substantially as described.

22. The combination of the vertically-oscillating cord-holder, its movable jaw and cutter, the pivoted switch, the horizontal binder-frame, the spring for holding the switch in working position, and the adjustable connecting-link, having a long loop or eye, substantially as and for the purpose set forth.

23. Inclined rotating knotter-spindles having rigid fingers, two reciprocating racks, a pivoted vertically-oscillating cord-holder, and a pivoted cord-finger, all supported on a horizontally-oscillating arm and moving with it, a vertically-oscillating and horizontally-swinging binder-arm, and operating mechanism, the whole arranged and combined substantially as and for the purpose set forth.

24. Inclined rotating knotter-spindles having rigid fingers on their upper ends and pinions on their lower ends, straight reciprocating racks, a pivoted finger, and a vertically-oscillating cord-holder, all supported and carried on a horizontally-oscillating arm, in combination with fixed camways supported on the binder-frame and connecting devices, substantially as described.

25. The inclined knotter-spindles having rigid projecting fingers on one end and pinions on the other, a pivoted cord-finger, and pivoted cord-guide connected with and supported by the removable knotter-stand, substantially as and for the purpose set forth.

26. The rotating gear-wheel supported in bearings on the binder-frame, the lever pivoted at one end thereto and at its other end to the lower end of a vertical rock-shaft, a binder-arm hinged to the upper end of said rock-shaft, a pitman connecting said binder-arm with the pivoted lever, the rigid arm connected with and projecting from the rock-shaft in the same vertical plane with the binder-arm, the inclined rotating knotter-spindles having rigid fingers, the straight reciprocating racks, the vertically-oscillating cord-holder, said knotter-spindles, racks, and cord-holder being carried by said horizontal arm, the fixed camways supported below said arm and parallel to it, and intermediate operating mechanism, the whole being arranged and combined for joint operation substantially as described.

27. The horizontally-oscillating knotter-arm, the inclined rotating knotter-spindles having rigid projecting fingers, a pivoted cord-finger, and pivoted cord-guide mounted on a removable stand, the cord-holder, the vertically-oscillating and horizontally-swinging binder-arm, the oscillating take-up carried thereby, and intermediate operating mechanism, arranged and combined for joint operation in the manner and for the purpose described.

28. A binder-frame arranged outside of and below the discharging ends of the elevator-aprons of a harvester, a vertical rock-shaft supported in bearings on said frame, a vertically-oscillating binder-arm hinged to the top of said rock-shaft, a lever hinged at one end to the lower end of said rock-shaft, its other end being pivoted to a rotary gear-wheel supported on said binder-frame and deriving its motion from the main driving-wheel of the harvester, a pitman connecting the lever with the binder-arm, a horizontal arm rigidly connected by one of its ends to the rock-shaft between the lever and the binder-arm and projecting from said rock-shaft at right angles thereto and in the same vertical plane with the binder-arm, inclined knotter-shafts having rigid fingers at one end and separate pinions at the other, straight reciprocating racks gearing with said pinions and having each a downwardly-projecting roller, said knotter-shafts and racks being supported on said rigid horizontal arm, a fixed camway for each roller supported on the binder-frame below said horizontal arm, and a slotted grain-receiving table arranged above said arm, the whole combined and arranged for joint operation substantially as and for the purpose described.

29. The pivoted cord-finger, in combination with its camway having different inclines for giving four separate movements to said finger: first, to bring the cord to the knotter-fingers; second, to move back to give room for the crossed cords on the knotter-fingers; third, a forward movement to push off the loop and complete the knot; and, fourth, a backward movement to permit the opening knotter-fingers to discharge the knot, substantially as described.

C. WHEELER, JR.

Witnesses:
FRANK R. RATHBUN,
WM. A. BAKER.